United States Patent [19]

Overbay et al.

[11] Patent Number: 5,225,645
[45] Date of Patent: Jul. 6, 1993

[54] ELECTRON DISCHARGE MACHINING TOOL

[75] Inventors: Mark A. Overbay, East Ridge, Tenn.; Donald E. Clark, Jr., Mission Viejo, Calif.

[73] Assignee: Combustion Engineering, Inc., Windsor, Conn.

[21] Appl. No.: 546,648

[22] Filed: Jul. 2, 1990

[51] Int. Cl.$^5$ .......................... B23K 9/00; B23H 1/00; B23H 11/00
[52] U.S. Cl. ................. 219/69.11; 219/69.2
[58] Field of Search ............... 219/69.11, 69.2, 69.13, 219/69.16; 29/33 K; 358/229

[56] References Cited

U.S. PATENT DOCUMENTS

| | | | |
|---|---|---|---|
| 2,996,638 | 8/1961 | Webb | 219/69.16 |
| 4,467,167 | 8/1984 | Oizumi et al. | 219/69.13 |
| 4,584,452 | 4/1986 | Zafred | 219/69.2 |
| 4,672,162 | 6/1987 | Burns et al. | 219/69.2 |
| 4,720,898 | 1/1988 | Calfo et al. | 29/33 K |
| 4,804,814 | 2/1989 | Southerland et al. | 219/69.2 |
| 4,916,282 | 4/1990 | Chammings et al. | 219/69.2 |
| 4,937,675 | 6/1990 | Starceski et al. | 358/229 |
| 5,086,201 | 2/1992 | Grypezynski et al. | 219/69.2 |

FOREIGN PATENT DOCUMENTS

| | | |
|---|---|---|
| 144616 | 6/1985 | European Pat. Off. |
| 180892 | 5/1986 | European Pat. Off. |
| 3823888 | 12/1989 | European Pat. Off. |

OTHER PUBLICATIONS

Patent Abstracts of Japan, vol. 10, No. 388, Dec. 1986 of Japan Patent document 61-178,122.

Primary Examiner—Geoffrey S. Evans
Attorney, Agent, or Firm—John H. Mulholland

[57] ABSTRACT

An electron discharge machining tool (10) for removal of conductive material from a workpiece such as a plug (28) in a nuclear steam generator tube (26) is an end effector connected to a remotely operated manipulator arm by a mount (56). A piston (47) drives a hollow conductive rod (44) with a graphite electrode cutter (30) in reciprocating motion through receptacle (14) having a restrictive drain (37) and containing deionized water. The reciprocation of rod (44) is controlled by power supply (50) sensing the electrical potential and signalling valve (48) which controls hydraulic flow in conduits (54a, 54b) communicated to opposite sides of the piston (47). A TV camera (32) and a light (34) mounted behind a lens (36) are used to monitor the machining.

2 Claims, 2 Drawing Sheets

ELECTRON DISCHARGE MACHINING TOOL

BACKGROUND OF THE INVENTION

Tube and sheet heat exchangers with some of the tubes plugged, are often repaired by methods which include steps of removal of plugs from the tubes. A mechanical removal tool was disclosed, for example, in U.S. Pat. No. 4,696,102 issued to Mark A. Overbay, one of the inventors of the instant application, and assigned to the same assignee as the instant application.

The process of electron discharge machining (EDM) is one by which workpiece materials that conduct electricity can be removed from a workpiece by an electric arc. The arc is created by creation of an electrical potential between an electrode of the tool and the conductive workpiece.

Steam generator repair which includes plug removal can be done by electron discharge machining but heretofore the tools for such work have been large and cumbersome. For this reason they have not easily been adapted for remote use as an end effector of a manipulator arm of the type now typically used in nuclear steam generator repairs to minimize worker exposure time to radiation.

SUMMARY OF THE INVENTION

The invention involves an electron discharge machining tool for the removal of conductive material from a workpiece portion, typically portions of plugs, within a confining structure, typically a nuclear steam generator tube. The tool is of a convenient size to be used as an end effector on the end of a remotely operated manipulator arm which can be positioned to align the tool under any of the steam generator tubes. Conventional remote operating means such as two stage air cylinders and collet type grippers pull a tube sheet mounting plate against the tube sheet with the electrode of the tool in alignment with the tube from which it is desired to remove a plug.

A housing means of the tool secured to the mounting plate, and therefore the tubesheet, defines a dielectric fluid filled receptacle open toward the workpiece or plug on one end and defining a reservoir of the fluid with the plug portions to be removed by arc erosion of the process. A graphite electrode of cruciform crosssection is reciprocally driven in the receptacle to create an electron discharge gap with the plug.

A conductive hollow drive rod connected to the electrode extends in a direction opposite the one end. It is in fluid communication with the receptacle. The drive rod end is connected to a hydraulic cylinder piston and defines a fluid passage through it. A fixed conductive hollow rod is telescopingly received within the hollow drive rod and the piston and defines an electrical terminal in sliding conductive engagement with the hollow drive rod as it reciprocates the electrode.

The hollow terminal rod also provides fluid communication of dielectric fluid to the drive rod and receptacle-reservoir from an outside supply. Typically, the dielectric fluid is deionized water which enters the terminal rod fluid passage from a plastic hose connected thereto.

The hydraulic cylinder is of the balanced fluid flow partition type. It is driven by a "Model No. 773-584" valve obtained from Moog Industrial Div. Prover Airport, East Aurora, N.Y., 14052. The valve is controlled and energized by means of a "Model 150" conventional unit from Hansvedt Corp., 6 Kettering Park, Urbana, IL 61801. As the electrical potential breaks down the water thin film in the gap between the electrode and the plug, the Hansvedt power supply unit responds to signal the Moog valve to reverse the flow in the hydraulic cylinder and retract the electrode for a given time period after which the electrode reverses and advances. During the time period the water flowing through the hollow terminal rod and hollow drive rod into the receptacle flows out of a drain at the base of the receptacle, flushing with it the material that has been arc eroded from the plug.

Adjacent the receptacle, behind a lens, is a TV camera and light for remote observation of the operation. A spray nozzle device maintains the lens clean for viewing the plug removing operation.

DETAILED DESCRIPTION OF THE ILLUSTRATED EMBODIMENT

Figure 1:
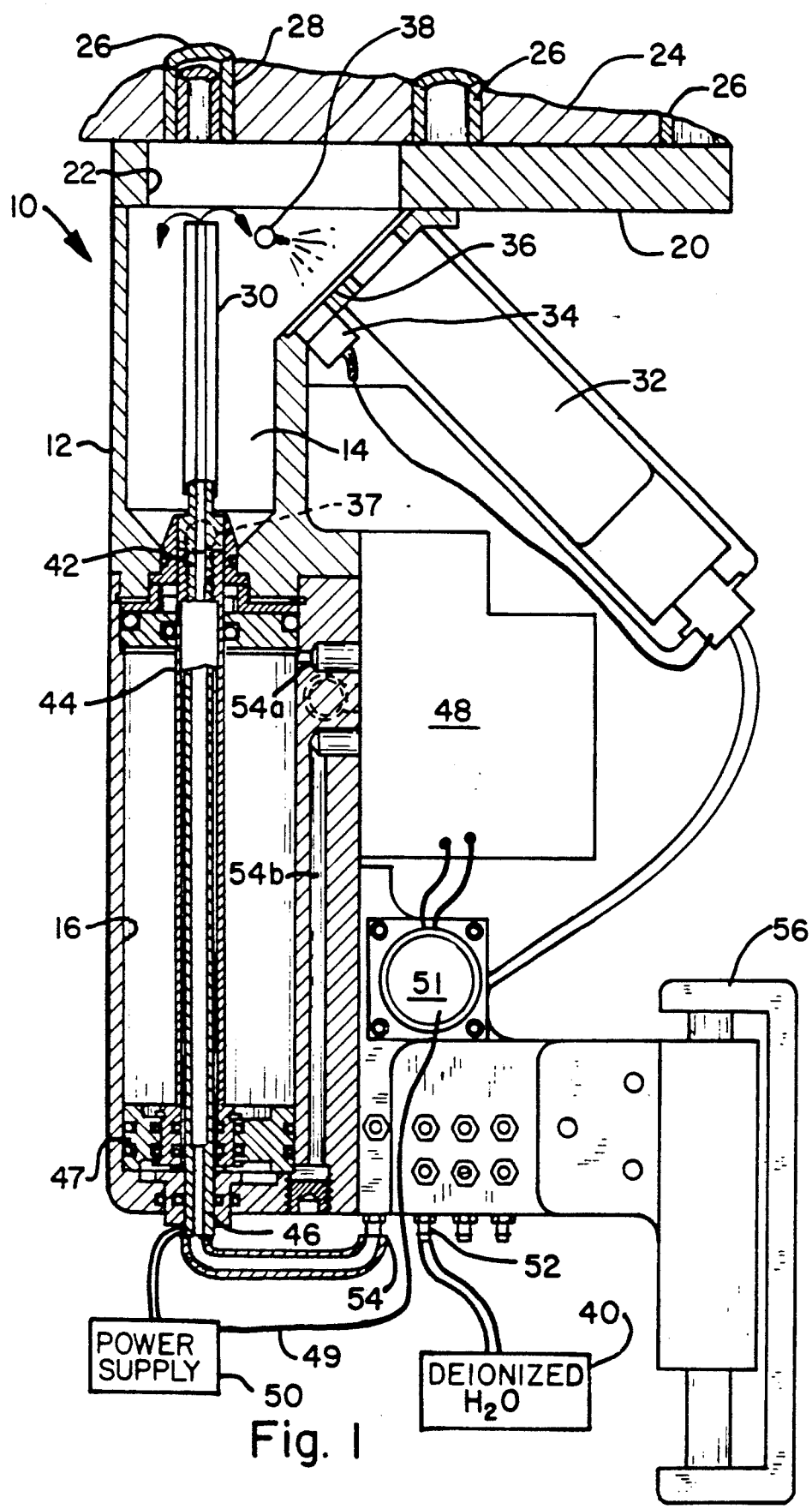
FIG. 1 is a schematic side elevational view, broken away for clarity of an electron discharge machining tool constructed according to the principals of the invention.
Figure 2:
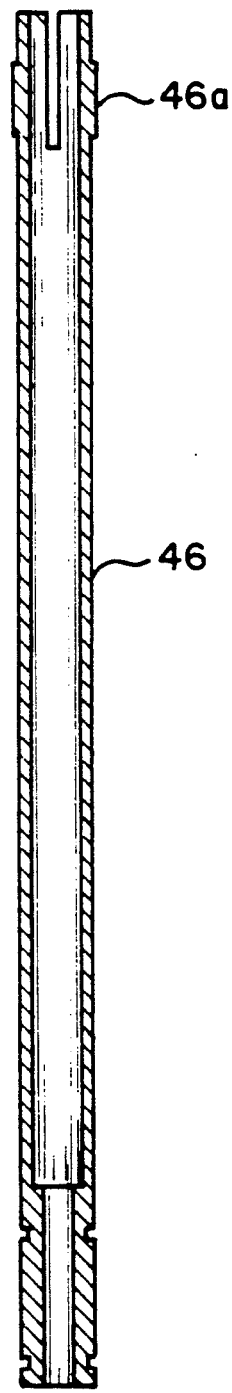
FIG. 2 is a side elevational cross-sectional view of the terminal or fixed rod of the tool of FIG. 1.

The number 10 generally designates an electron discharge machining tool constructed according to the principals of the invention.

The tool 10 includes a housing 12, having a receptacle 14 and a hydraulic cylinder 16. At the open upper end of the housing 12 is a mounting plate 20. An opening 22 in plate 20 is provided such that upon connection of the tool by means of the mounting plate 20 to the underside of a nuclear steam generator tubesheet 24, the opening 22 is aligned with at least one tube 26 which is plugged by a metal plug 28 to be removed.

The dimensions of the opening 22 are such that a hollow graphite electrode or cutter 30 of cruciform shape can reciprocate in the receptacle 30 and extend upward through opening 22 to create a arc or electron discharge gap, typically of 0.003 to 0.004 inches, with plug 28. At the same time the opening 22 is large enough for a TV camera 32 and light 34 mounted on housing 12 behind a LEXAN lens to provide a video signal for the remote operator.

The plate 20 is gasketed to seal-in dielectric fluid, typically deionized water which flows up through and out of the upper end of the cutter. This creates a positive pressure and fills the receptacle 14, opening 22 and with the bottom of plug 28, defines a reservoir of dielectric fluid. A restrictive drain 37, shown in FIG. 1 in hidden lines behind the cutter, provides an outlet for the flushing of water and disintegrated plug material resulting from the spark or arc erosion of the plug. As the plug 28 is cut by the graphite cutter 30 it collapses on itself and is removed. The cutter is made by "POCO" and is of a graphite known as "Grade 3".

The TV camera 32 used is typically a Sony Model NVM-42C CCTV. The light 34 is made up of a "Littlefuse Fuseblock No. 354012-GY" lampholder and the lamp is a Sunray Fuselamp SR-12V. A 90° fitting 38 directs a flow of dielectric fluid in the reservoir from the source 40 against the lens 36.

The graphite cutter 30 is mounted, as by threads, on a hollow conductive adapter 42, which is in turn threadedly mounted on a hollow conductive piston rod 44 by means of threads 44a.

Figure 3:
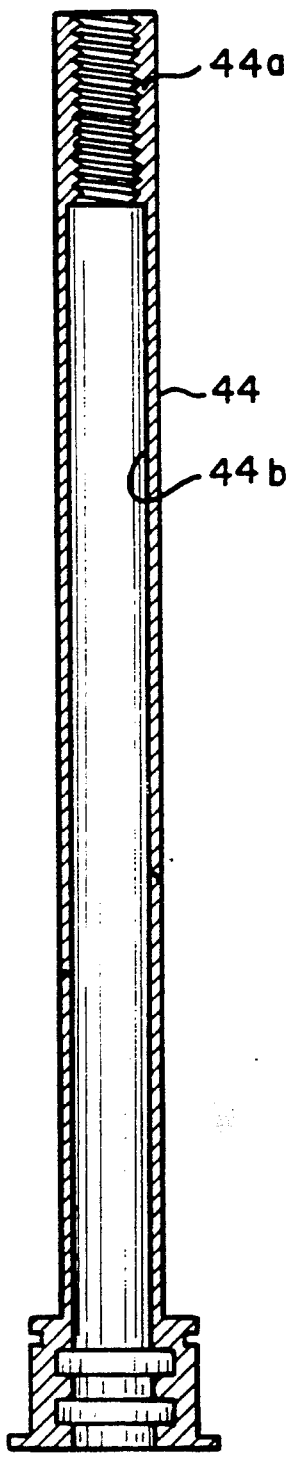
FIG. 3 is a side elevational cross-sectional view of the piston rod or means for dirving the electrode in which the fixed rod is telescopingly received.

The piston rod 44 is shown in FIG. 3 and has telescoped within it the fixed terminal 46. The terminal 46 is also conductive and hollow and the sliding connection between portion 46a and the internal bore 44b of piston rod 44 acts as a conductive path between the two relatively movable elements.

The piston 47 which drives piston rod 44 is in hydraulic cylinder 16. A balanced flow partition type of action in hydraulic cylinder 16 by piston 47, driving piston rod 44, and cutter 30 through adapter 42, is created by the Moog valve 48. The action or movement is in response to signals the valve gets through cable 49 from the Hansvedt EDM power supply unit 50. These signals as do all electrical control connections, pass through connector 51. The valve signals, are in response to the electrical potential between cutter 30 and plug 28 through the dielectric fluid and a timer, as controlled by power supply 50.

The power supply 50 advances cutter 30 to within 0.003 or 0.004 inches of plug 28 such that an eroding arc disintegrates metal of the electrically grounded plug. When the power supply 50 sensing the electrical potential determines that the thin film of dielectric, i.e., water, breaks down, the signal to the Moog valve 48 to reverse the piston 47 is given and this is done by flow through hydraulic fluid conduits 54a and 54b. The power supply allows this to happen for a short period of time, a couple of pulses, and the piston 47 is again reversed and advanced to disintegrate more of plug 28. During the timed retraction period, the water exiting the upper end of cutter 30, as shown by the arrows, flushes the disintegrated metal down and out restricted drain 37.

The deionized water used for a dielectric fluid flows from source 40 to a water connection 52 in the housing. The connection 52 by means of internal conduit, not shown, conveys water to an outlet fitting 54 connected by a plastic hose to the end of the hollow terminal 46.

The piston rod 44, adapter 42 and cutter 32 are in fluid communication with terminal 46.

The tool 10 is supported on a manipulating arm for positioning by means of a conventional mounting structure 56. A connection by means of a dovetailed bracket holds the tools in aligned position for use, for example, on the underside of a tubesheet of a steam generator of a nuclear steam supply system. The mounting plate 20 is attached to the tubesheet 20 and creates the sealed reservoir of dielectric fluid.

We claim:

1. An electron discharge machining tool for the removal of conductive material from a workpiece portion within a confining structure which comprises:
   a housing defining a dielectric fluid receptacle open on one end toward a conductive workpiece portion and shaped for defining with the workpiece a reservoir for the dielectric fluid,
   an electrode reciprocally driven in said receptacle to create an electron discharge gap with said workpiece for generating an arc,
   means for driving said electrode,
   said means for driving extending in a direction opposite said one end and defining a hollow conductive reciprocating rod in fluid communication with the receptacle and conducting and supporting relation with said electrode,
   said means for driving being connected to a piston of a hydraulic cylinder,
   a fixed conductive hollow rod telescopingly received within said means for driving and said piston,
   said rod defining an electrical terminal in sliding contact and conductive engagement with said means for driving and fluid communication with said means for driving,
   electrically controlled valve means reciprocating said piston in said hydraulic cylinder and said electrode through said means for driving,
   said valve means being controlled from a power supply which acts in response to the electrical potential between said electrode and said workpiece, and
   a camera and a light mounted behind a lens adjacent the electrode.

2. The electron discharge machining a tool of claim 1 in which means to clean the lens is included.

* * * * *